United States Patent
Lei et al.

(10) Patent No.: US 11,064,065 B2
(45) Date of Patent: Jul. 13, 2021

(54) METHOD AND APPARATUS FOR CELLULAR NETWORK BACKUP CONNECTIVITY

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 957 days.

(21) Appl. No.: 15/098,754

(22) Filed: Apr. 14, 2016

(65) Prior Publication Data

US 2017/0302774 A1  Oct. 19, 2017

(51) Int. Cl.

| | |
|---|---|
| *H04M 1/72412* | (2021.01) |
| *H04W 64/00* | (2009.01) |
| *H04W 36/14* | (2009.01) |
| *H04W 4/44* | (2018.01) |
| *H04W 4/024* | (2018.01) |
| *H04W 48/16* | (2009.01) |
| *H04W 4/80* | (2018.01) |
| *H04W 4/02* | (2018.01) |
| *H04W 4/48* | (2018.01) |
| *H04W 88/06* | (2009.01) |

(52) U.S. Cl.
CPC ....... *H04M 1/72412* (2021.01); *H04W 4/023* (2013.01); *H04W 4/024* (2018.02); *H04W 4/44* (2018.02); *H04W 4/80* (2018.02); *H04W 48/16* (2013.01); *H04W 64/003* (2013.01); *H04W 4/48* (2018.02); *H04W 36/14* (2013.01); *H04W 88/06* (2013.01)

(58) Field of Classification Search
CPC ... H04M 1/7253; H04W 4/046; H04W 8/005; H04W 64/003
See application file for complete search history.

(56) References Cited

U.S. PATENT DOCUMENTS

| | | | |
|---|---|---|---|
| 8,248,931 B2* | 8/2012 | Klein | H04W 4/00 370/230 |
| 2010/0254346 A1* | 10/2010 | Jain | H04W 36/32 370/331 |
| 2014/0096217 A1 | 4/2014 | Lehmann | |
| 2014/0274069 A1* | 9/2014 | Scheim | H04W 28/08 455/444 |
| 2015/0333392 A1 | 11/2015 | Thiam et al. | |

(Continued)

FOREIGN PATENT DOCUMENTS

| | | |
|---|---|---|
| CN | 102484493 A | 5/2012 |
| CN | 102547612 A | 7/2012 |

(Continued)

*Primary Examiner* — Joshua L Schwartz
(74) *Attorney, Agent, or Firm* — Michael Spenner; Brooks Kushman P.C.

(57) ABSTRACT

A system includes a processor configured to detect the presence of a wireless network access point usable for vehicular communication. The processor is also configured to connect to the wireless access point and report connection information relating to the connected wireless access point to an entity capable of establishing direct cellular connection with a vehicle, identifying the connected wireless access point as an alternative communication method if cellular communication is unavailable.

12 Claims, 4 Drawing Sheets

(56) References Cited

U.S. PATENT DOCUMENTS

| | | | | |
|---|---|---|---|---|
| 2016/0112864 A1* | 4/2016 | Harber | ............... | H04W 4/028 |
| | | | | 455/432.3 |
| 2016/0183152 A1* | 6/2016 | Yoshizawa | ........ | H04W 52/0206 |
| | | | | 455/444 |
| 2017/0032402 A1* | 2/2017 | Patsiokas | ........... | G06Q 30/0261 |
| 2017/0094605 A1* | 3/2017 | Dalke | ............... | H04W 52/0274 |

FOREIGN PATENT DOCUMENTS

| | | |
|---|---|---|
| CN | 102572982 A | 7/2012 |
| CN | 102625239 A | 8/2012 |
| CN | 103024935 A | 4/2013 |
| CN | 103067440 A | 4/2013 |
| CN | 103475710 A | 12/2013 |
| CN | 103871273 A | 6/2014 |
| CN | 104584593 A | 4/2015 |
| CN | 104794760 A | 7/2015 |
| CN | 105336161 A | 2/2016 |
| WO | 2014089384 A2 | 6/2014 |
| WO | 2015007989 A | 1/2015 |
| WO | 2015163743 A | 10/2015 |
| WO | 2016049386 A2 | 3/2016 |

\* cited by examiner

US 11,064,065 B2

METHOD AND APPARATUS FOR CELLULAR NETWORK BACKUP CONNECTIVITY

TECHNICAL FIELD

The illustrative embodiments generally relate to a method and apparatus for cellular network backup connectivity.

BACKGROUND

Remote communication with a vehicle (e.g., communicating with a vehicle from a remote computer) is increasing in popularity as remote-control of vehicle functionality grows in capability. Not only can users use a phone, personal computer (PC), tablet, etc. to connect to and control vehicle functions, but third-party service providers can connect to vehicles remotely to diagnose vehicle problems. Original equipment manufacturers (OEM)s can connect to vehicles to retrieve utilization information and provide software and firmware updates.

Connections to the vehicle are frequently enabled through a vehicle telematics control unit (TCU). Using an embedded modem or a wireless device providing cellular connectivity to the TCU, the TCU can enable and facilitate communication with a remote source through a cellular network. This enables features such as temperature control and remote start from a great distance. As long as both the vehicle and the user can connect to a cellular network, the user can access remote-controlled vehicle functionality from anywhere on earth.

SUMMARY

In a first illustrative embodiment, a system includes a processor configured to detect presence of a wireless network access point usable for vehicular communication. The processor is also configured to connect to the wireless access point and report connection information relating to the connected access point to an entity capable of establishing direct cellular connection with a vehicle, identifying the connected access point as an alternative communication method if cellular communication is unavailable In a second illustrative embodiment, a system includes a processor configured to receive indicia from a vehicle that a cellular network is unusable for processor-to-vehicle communication. The processor is also configured to receive identification, from the vehicle, of a wireless access point usable for processor-to-vehicle communication. The processor is further configured to receive requests to remotely access vehicle functionality and utilize the wireless access point to relay the received requests to the vehicle until indicia is received from the vehicle that the cellular communication network is usable for processor-to-vehicle communication In a third illustrative embodiment, a computer-implemented method includes searching, using a vehicle computer, for a usable dedicated short range communication (DSRC) access point in communicable proximity to a vehicle, responsive to a determination that a cellular signal provided to a telematics control unit has fallen below a predetermined usable threshold, and reporting connection information for the DSRC access point to a remote entity along with instructions to utilize the DSRC access point for vehicle communication.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
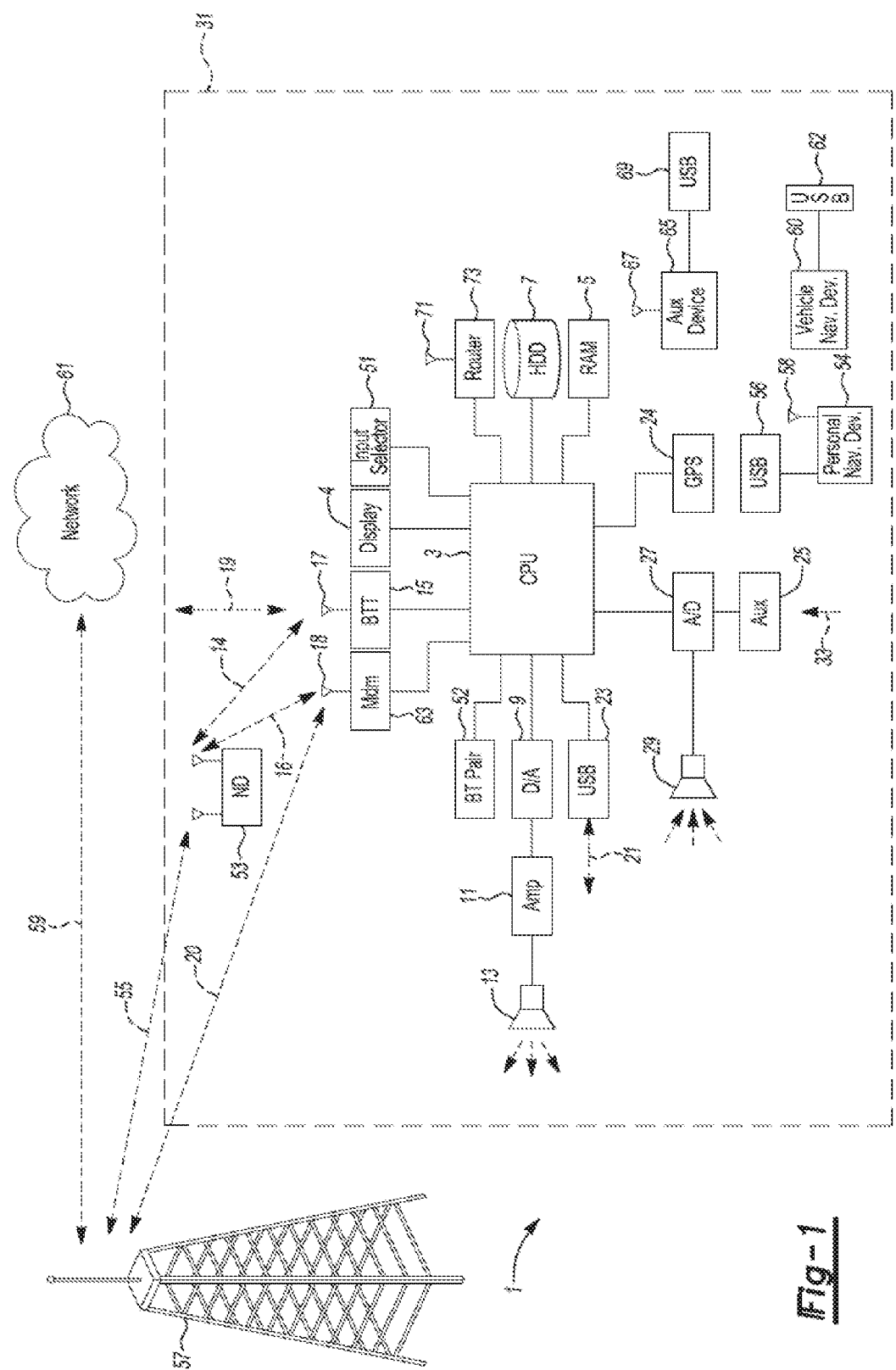
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Users are growing accustomed to accessing advanced vehicle function control through remote communication with a vehicle. Developments in the area of function control include, but are not limited to, remote start, remote temperature control, remote window control, remote stereo control, remote camera monitoring, remote security system control, vehicle preconditioning control, and others. Service technicians may also be able to remotely access a vehicle to diagnose a problem. This can even include listening to a cabin interior of a vehicle while the vehicle is traveling, to identify sounds that may be indicative of a problem. Even OEMs will use remote communication with a vehicle, which can be leveraged for tracking system utilization, crowdsourcing user gathered data, providing software and firmware updates and a variety of other services.

With all of these possible remote communication solutions utilizing a remote connection to a vehicle, it can be problematic if communication with a vehicle is lost or cannot be established. Most commonly, vehicle communication to provide the functionality noted above is facilitated through use of a cellular connection. Onboard vehicle modems or user devices with cellular capability can be utilized by a telematics control unit to provide remote communication capability to a vehicle. If a cellular connection is lost or if a signal strength is too low for reliable (or any) communication, functionality which relies on the cellular communication for data transfer can be rendered inoperable.

Common examples of a user losing remote connectivity include, but are not limited to, parking in a deep garage deck, traveling (or parking) within tall buildings (known as urban canyons), or traveling and/or parking a vehicle in a remote location where cellular connectivity may not be available. In these and similar instances, when a user seeks to utilize remote connectivity for function control, the user may discover that the capabilities with which the user has become accustomed are suddenly no longer available. Losing commonly enjoyed functionality can diminish the user experience, and can cause some level of user dissatisfaction with a particular vehicle's functionality. For example, if a user had parked a vehicle at a remote wilderness parking lot and had traveled into the woods for a camping trip, the user may want to heat or cool the vehicle before returning to the vehicle after camping. Since such functionality may commonly be available at a home location, the user may have no reason to expect a loss of this functionality when traveling. Assuming the user can establish a cellular signal (for command transmission), the user may be disappointed if an attempt to control the climate of a vehicle remotely fails, especially if weather conditions are somewhat extreme. A similar problem may occur in a much more common scenario, wherein the user has simply parked a vehicle in a garage location that is too shielded for cellular communication to occur.

The illustrative embodiments propose a system whereby if a cellular signal is lost or weak (for example, below a predefined threshold for reliable communication), a backup methodology for communication can be employed, so that remote function control is far less likely to be lost. The proposed solution leverages a dedicated short range communication (DSRC) network. DSRC uses an automobile-dedicated communication bandwidth, and it is expected that a mesh network of DSRC transceivers will be installed along the nation's roadways and thoroughfares in the late 2010's or early 2020's. Using such a network, backup communication can be established with a vehicle when cellular service fails or a signal strength drops to a unreliable level. A similar solution can be facilitated through a Wi-Fi access point, if the vehicle is in communicable proximity to such a transceiver.

As a vehicle encounters a DSRC access point (or usable Wi-Fi access point), it can send an identification of the access point to a backend server that is usable to facilitate remote vehicle communication. In another example, the vehicle may search for a nearby access point if and when a cellular signal drops below a usable/reliable level and identify the nearby access point to the remote server. In common practice, the remote server may typically receive remote access requests through the internet or a cellular network. One of the functions of the server may be to act as a gatekeeper for such requests, routing them to the appropriate vehicle over a cellular connection. When the server is also made aware of a network location (on a DSRC or Wi-Fi network) where the vehicle can currently be contacted, any failure in a cellular communication attempt can be potentially rectified through communication with the vehicle over the DSRC or Wi-Fi network. Since the DSRC network may eventually stretch across virtually all travelable roadways, it can provide a reasonably reliable backup for communication in such an instance. With a broad enough DSRC network, there will be very few instances where a vehicle is not remotely reachable through either a cellular or DSRC network connection.

Currently, if a user attempts to connect to a vehicle using communication routed to the vehicle through a cellular connection, and the vehicle is out of cellular communication range, the user may experience an error message or simply fail to connect to the vehicle. Through use of the illustrative embodiments and the like, the user will have access to the vehicle under a wider range of conditions and locations, and will be less likely to experience a communication error or failure.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Figure 2:
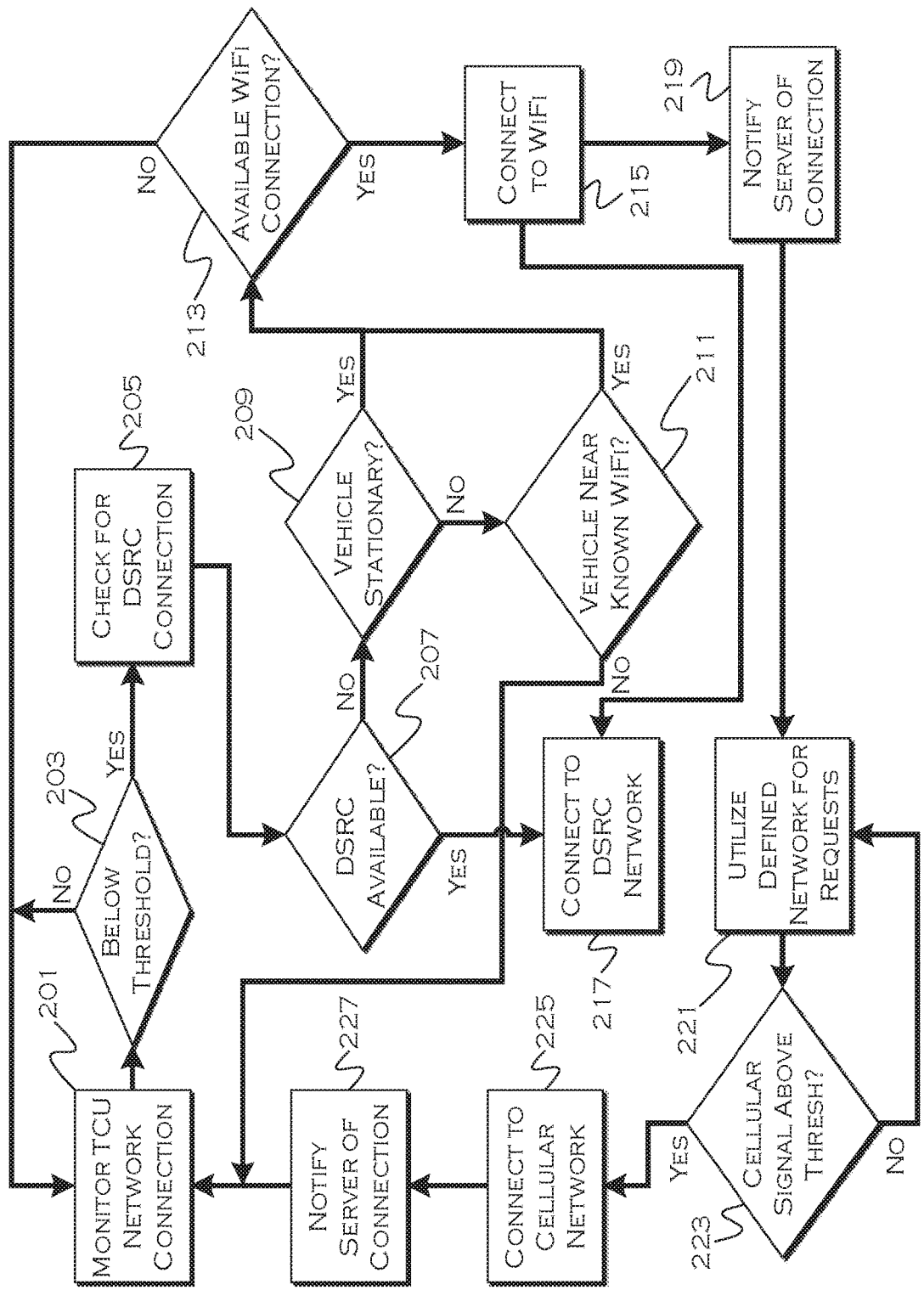
FIG. 2 shows an illustrative process for establishing backup connectivity.

FIG. 2 shows an illustrative process for establishing backup connectivity. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative example shown in FIG. 2, the vehicle will report a usable local wireless network connection (in this example a DSRC connection) if a cellular signal drops below a reliable and/or usable threshold. It is also possible for the vehicle to constantly report the presence of any usable local wireless transceivers (such as DSRC or Wi-Fi) for use in backup instances when a cellular connection fails. Since the vehicle can communicate with the remote server through the DSRC connection itself, a lack of usable cellular communication should not prevent the vehicle from reporting a usable DSRC connection.

In this example, the process running on the vehicle monitors a cellular signal usable by the TCU to establish communication over a cellular network 201. This can be a signal provided through an onboard modem or through a wireless device in communication with the TCU (such as a user cellular phone). If multiple cellular communication sources are available, the process may check the signal strength of all usable cellular signals before reporting a DSRC alternative. Again, as previously noted, it is also possible that the system will always report the presence of a DSRC alternative, even if sufficient cellular signal strength is detected.

Here, if the usable cellular signal(s) has/have dropped below a reliable or predetermined threshold level 203, the process will scan for a usable DSRC transceiver 205. In another similar example, it may be the case that DSRC communication is also perpetually maintained when a suitable DSRC transceiver is proximate to a vehicle, so instead of scanning for the transceiver the process may simply determine or access the address of an already identified or connected DSRC transceiver.

If there is no available DSRC transceiver 207, the process may check if the vehicle is stationary 209. If the vehicle is not stationary, the process may determine if the vehicle is in communicable range of a public or otherwise usable Wi-Fi communication point 211.

If the vehicle is stationary or is within range of a known or identified Wi-Fi access point, the process may determine if the Wi-Fi communication point is usable 213. This determination can also include a determination as to whether the Wi-Fi communication point should even be identified (for example, a vehicle passing a known Wi-Fi communication point at 60 miles per hour will probably get very little utility out of the Wi-Fi communication point before the vehicle travels outside a communicable range).

If the vehicle can (and should) connect to and use the Wi-Fi communication point, the process may establish a connection with the identified Wi-Fi access point 215. The reasonableness of a such a connection can be determined, for example, without limitation, by determining that a vehicle is stationary, that a vehicle route should keep the vehicle in communicable range for a threshold time period, that a vehicle will likely stop within a communicable range of the Wi-Fi access point, that a Wi-Fi mesh or point-to-point network of which the Wi-Fi access point is a part will be in communicable range of the vehicle for a threshold time period, etc. In some instances, the vehicle will only report the wireless access point if a determination process determines that the wireless access point will remain in communicable proximity to the vehicle for a threshold period of time.

Similarly, the vehicle may connect to a DSRC access point 217 if such an access point is available. Similar determinations about the reasonableness of the DSRC connection could be performed, but if the DSRC network extends along a roadway and/or throughout a parking lot, for example, then the need for the communicable range determinations may be lessened. Instead, the vehicle can connect to each DSRC transceiver in the network as it becomes available, identifying each point as a new connection is established.

When a connection to the DSRC or other wireless network has been established, the process will notify the remote routing server of the established connection 219, which can include an identification of the network MAC address of the access point. This can allow the server to route incoming remote access requests to the connected access point, where they can subsequently be routed to the vehicle. In a similar manner, the vehicle will register the connection locally, and any onboard requests for communication with a remote device can be routed through the DSRC network 221 (as opposed to unsuccessfully trying to use an unavailable or unreliable cellular connection). As long as a cellular signal (which can be constantly monitored by the process) remains below a reliable or usable threshold 223, the process can continue to use the DSRC (or other) wireless network for remote communication. If the vehicle is in motion, it may periodically refresh the identified and connected DSRC transceiver, as new transceivers become available and previously connected transceivers become outside a communicable range. As long as a one or more DSRC or other wireless access points is in communicable range (and is usable by the vehicle), a reliable backup for failed cellular communication can be established.

Once one or more of the cellular signals available for use by the TCU rises above the usable or reliable threshold 225, the process can switch back to using cellular communication. This can include informing the remote gateway server that the cellular connection is again usable 227. At this point, the cellular signal monitoring process can begin anew.

In an environment absent the illustrative embodiments, a user may issue a remote access request which is transmitted to the gateway server. The gateway server may then attempt to dial up the vehicle through a known cellular number over a cellular network. If the vehicle is out of cellular range, if the cellular network is down, or if the cellular connection is spotty and unreliable, the user may experience some frustration as the attempted remote access request fails or takes a long time to process.

Through use of the illustrative embodiments, the vehicle notifies the server when a cellular connection is unusable or unreliable. Since the vehicle has also identified a currently-usable alternative method of communication, the remote server can simply use the alternative method of communication to efficiently and reliably relay the remote access request to the vehicle. In another example, even if the vehicle has not yet identified that cellular communication may or will fail, and if the vehicle perpetually identifies usable DSRC alternative communication points, then a failed cellular connection attempt by the server can simply be retried through the DSRC network before reporting a failure to the requesting entity.

Figure 3:
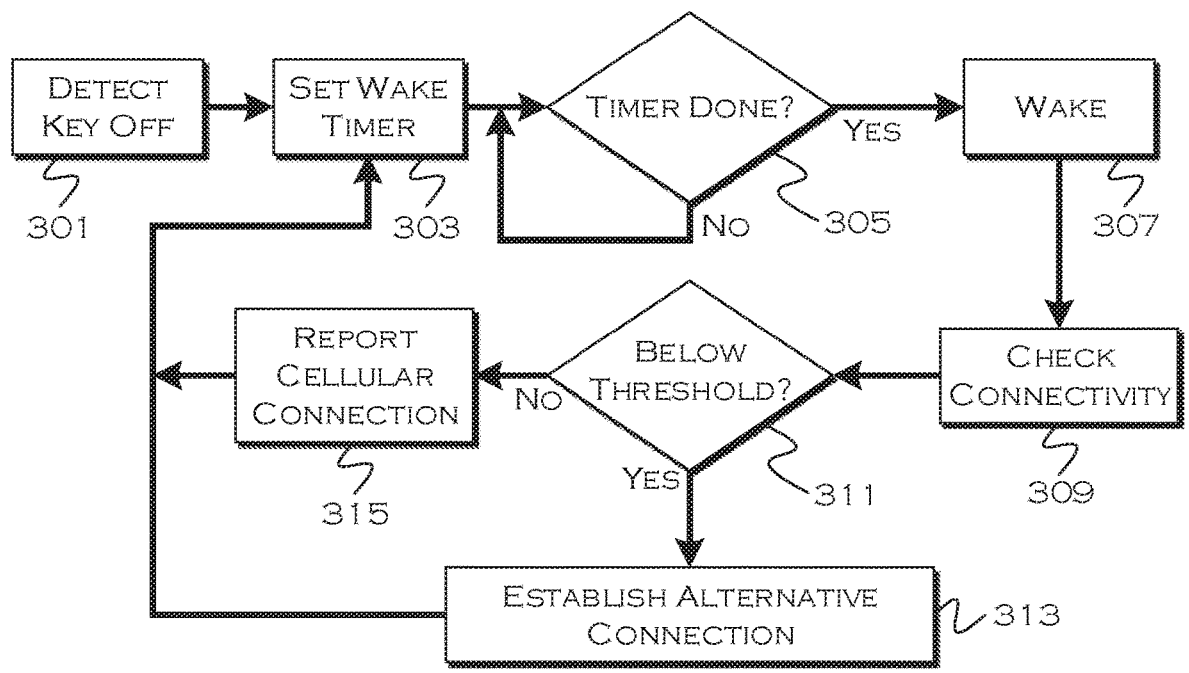
FIG. 3 shows an illustrative process for a connectivity check.

FIG. 3 shows an illustrative process for a connectivity check. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this non-limiting example, a vehicle may experience some loss of connection at a point after the vehicle has been powered down. This can be problematic or annoying for a user, if the cellular connection (and attendant remote functionality control) is expected based on the usable presence of a cellular signal when the vehicle was initially parked. For example, it is not uncommon for a cellular signal to be rendered unusable by an extreme volume of potential users, such as at a sporting event. When a user arrives at the event, for example, at seven A.M., the user may be able to freely remotely access vehicle functionality because many of the attendees have not yet arrived.

Later, when a large number of cellular users have arrived at the event, the cellular network may become so overloaded that remote functionality may be rendered significantly delayed or even unusable. The illustrative example in FIG. 3 provides for communication backup in such an instance.

In this example, the process detects a key-off 301 (or, for example, a vehicle being placed in a park-state) as indicative of an intent to cease vehicle motion. In one example, the process may take the opportunity to identify one or more currently available DSRC or other usable wireless (such as Wi-Fi) access point(s) and report this/these access point(s) to the gateway server. In this illustrative embodiment, the process sets a wake-timer 303 so that the vehicle can periodically wake-up (e.g., run on limited power for a brief period) to determine if a switch to a DSRC or other wireless connection should be made (or if a switch from DSRC back to cellular should be made). For a variety of reasons, it may be preferable or even mandated that cellular connections should be used if such connections are available. For example, to reduce strain on a DSRC network and to avoid consuming too much bandwidth, the DSRC network may only be available for use if and/when a cellular connection cannot be reliably utilized. In another example, the DSRC network may have transport constraints applied thereto, limiting the amount of communication that can be sent to a particular vehicle over a given time period or connection instance.

If such limitations apply, it may not only be useful to know when to switch to DSRC from an unusable cellular connection, but also to know when the cellular connection is again available. In this manner, unrestricted cellular communication can be used when appropriate, relying only on the DSRC when permissible or when cellular communication cannot be used.

In the illustrative example, when the wake-timer expires 305, the process may wake the vehicle 307. In this example, waking the vehicle includes providing enough power to power the TCU and any other communication and identification components needed to check the cellular connection, check for a DSRC connection and report which connection should be used to the gateway server. It is also worth noting that the reporting of which connection should be used does not necessarily need to be done to a gateway server. For example, it may be the case that a mobile device uses a direct connection to the TCU over a cellular network to provide vehicle function control, and in such an instance the reporting may be done to the mobile device itself (so that the mobile device can route requests to the appropriate access point).

The process can check for the signal strength of any usable cellular connections 309, and if the signal strength of all available cellular connections has dropped below a usable/reliable threshold 311, the process can establish an alternative DSRC connection 313. Establishing this connection can include reporting the connection and DSRC access point information to a remote entity such as the gateway server. At this point, since a reliable alternative to the unusable cellular connection has been established, the vehicle can return to a sleep state after resetting the wake timer. At the next wakeup point, the process may discover that the cellular signal has resumed usable strength, and a switch can be made (along with appropriate reporting) back 315 to the now-usable cellular communication network. In this manner, the process can continue to reliably provide usable, reasonable alternatives to cellular communication while a vehicle is in a parked state, allowing a user to access remote vehicle functionality with increased reliability.

Figure 4:
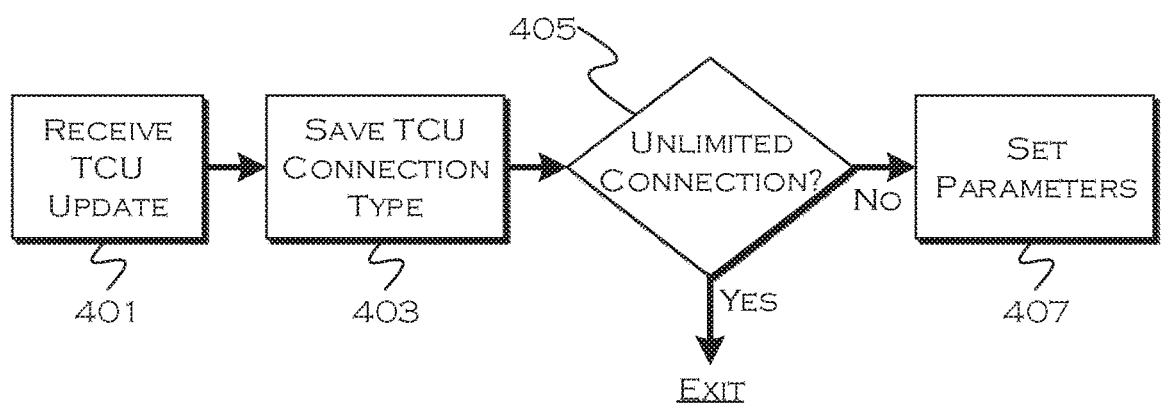
FIG. 4 shows an illustrative process for TCU connection configuration.

FIG. 4 shows an illustrative process for TCU connection configuration. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, it is contemplated that a DSRC access point or other alternative to cellular communication may have some use-restrictions applied thereto. These can include, but are not limited to, maximum data transmission levels (on a per-use or aggregate basis), maximum usable bandwidth, and/or restrictions on the type of relayable requests.

In this example, it is assumed that at least one DSRC or Wi-Fi alternative to cellular communication has some form of restriction for illustrative purposes. The gateway server or other device that will communicate directly with the vehicle receives an update from the vehicle TCU, identifying the current usable connection 401. For example, the TCU may identify a DSRC access point deployed as part of a government installment of a DSRC mesh network. The device saves the connection type 403 for use in sending future remote access requests to the TCU.

Also, in this example, any known restrictions may be uploaded by the TCU or identifiable (for example, from a lookup table) based on an access point type or address. If the connection is unlimited 405 (that is, has no restrictions), the process exits. If the connection has associated transmission or other restrictions, the process sets a series of parameters 407. This will allow the process to route appropriately configured requests, configure requests according to the parameters, and reject requests that cannot be configured or sent according to the set parameters.

For example, a government owned DSRC network may be usable for vehicle communication from a remote source if: a) there is no usable cellular connection available; b) the request is sent in packets of under a certain size; and c) the aggregate data transfer does not exceed a predefined limit. A first request, N, may come at a time when a cellular connection is also available, and thus may be routed over the cellular connection (that being the saved connection at the time). A second request, O, may come at a time when a cellular connection is not available, and may be packetizable into sufficiently small packets and thus be transmitted over the DSRC network. A third request, P, may be received following O, and may exceed (alone or in conjunction with O) the aggregate allowable data transfer. This request will either be rejected or queued until a less-limited form of communication with the vehicle is available.

Figure 5:
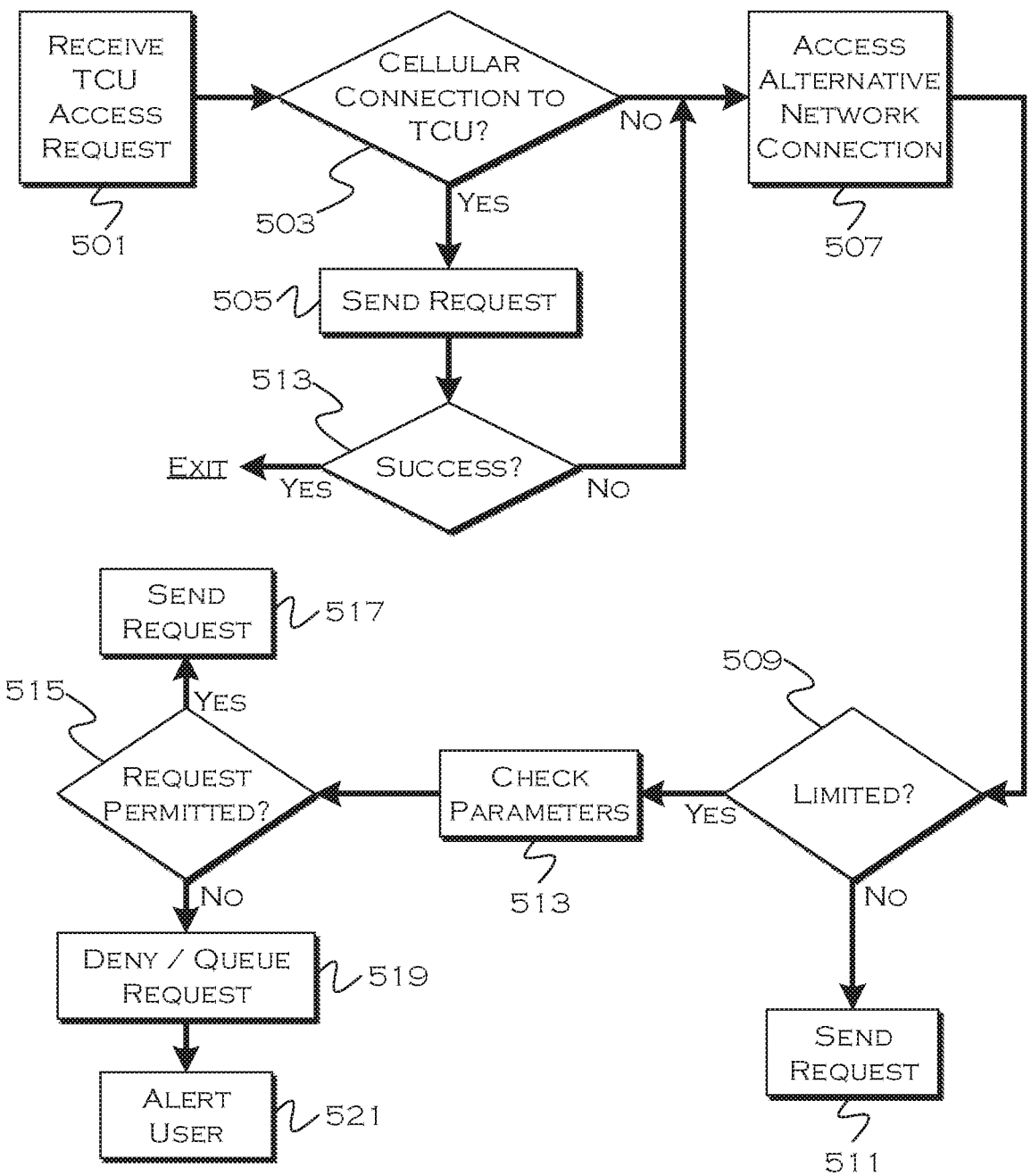
FIG. 5 shows an illustrative process for remote communication routing.

FIG. 5 shows an illustrative process for remote communication routing. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process receives a request from a remote source (or the process is executing on the requesting entity) to access vehicle functionality remotely 501. The process checks a stored identified connection type, and if a cellular connection is available 503, the process will send the request via cellular connection with the TCU 505. It may also be the case that the TCU has not yet informed the remote gateway or entity that the cellular connection is no longer available, so in that instance the remote request sent via cellular may fail 523.

If the cellular connection is not available 503 (having been identified as such by the TCU recognizing that the cellular signal at the vehicle has degraded below a usable level) or if an attempt to communicate via the cellular connection fails 523, the process accesses a saved alternative communication method 507. This could be, for example, a DSRC access point identified as a matter-of-course as a vehicle travels or parks, or identified in response to a vehicle determining that a cellular network is presently unusable.

In this example, the process also checks if there are any limitations (such as those discussed with respect to FIG. 4) associated with the alternative communication method 509. If there are no limitations, the process will send the request via the alternative communication method 511. If there are limitations, the process will check saved parameters 513 to determine if the request is permitted to be sent via the alternative communication method 515. This permissibility check can also include, for example, a configuration of the request into a form or format that is permissible in accordance with the noted parameters.

If the request is permissible (or can be configured so as to be permissible), the process will send the request to the vehicle 517. If the request is not permissible and/or cannot be configured so as to be permissible, the process will, in this example, either reject or queue the request as appropriate 519. Some requests, such as a request to set a vehicle interior to a certain temperature, may be suitable for queuing, whereas other requests, such as a request to remotely start a vehicle, may only be queued for a very limited time or not queued at all (to avoid, for example, remotely starting a vehicle at an unexpected time). The process may also alert the user of the queuing or rejection 521, and at this point the user could send a different request, elect to de-queue or queue a request that was queued or not queued, respectively, or take any other suitable action.

Through use of DSRC networks and other alternatives to cellular communication, including proactive identification by a vehicle of the proximate usable alternatives, the illustrative embodiments allow for enhanced and more reliable user remote access to a vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
detect a presence of a wireless network access point usable for vehicular communication;
connect to the wireless access point; and
report connection information relating to the connected access point to an entity capable of establishing direct cellular connection with a vehicle, identifying the connected access point as an alternative communication method when cellular communication is unavailable and responsive to a determination that a cellular signal provided to a telematics control unit has fallen below predetermined usable threshold, searching, using a vehicle computer, for a usable dedicated short range communication (DSRC) access point in communicable proximity to a vehicle and reporting connection information for the DSRC access point to a remote entity along with instructions to utilize the DSRC access point for vehicle communication.

2. The system of claim 1, wherein the access point is a Wi-Fi access point.

3. The system of claim 1, wherein the access point is a dedicated short range communication access point.

4. The system of claim 1, wherein the processor is configured to search for the access point responsive to a determination that a cellular signal has fallen below a predefined usability threshold.

5. The system of claim 1, wherein the processor is configured to report the connection information responsive to a determination that a cellular signal has fallen below a predefined usability threshold.

6. The system of claim 1, wherein the processor is configured to utilize the access point for communication with the entity, responsive to a determination that a cellular signal has fallen below a predefined usability threshold, until the processor determines that the cellular signal has risen above the predefined usability threshold.

7. The system of claim 1, wherein the processor is configured to determine if the access point will remain in communicable proximity to the vehicle for more than a predetermined threshold period of time.

8. The system of claim 7, wherein the processor is configured to report the connection information in response to a determination that the access point will remain in communicable proximity to the vehicle for more than the predetermined threshold period of time.

9. The system of claim 7, wherein the processor is configured to determine if the access point will remain in communicable proximity to the vehicle for more than the predetermined threshold period of time based on vehicle speed.

10. The system of claim 7, wherein the processor is configured to determine if the access point will remain in communicable proximity to the vehicle for more than the predetermined threshold period of time based on a vehicle route.

11. The system of claim 7, wherein the processor is configured to determine if the access point will remain in communicable proximity to the vehicle for more than the predetermined threshold period of time based on a vehicle park-state.

12. The system of claim 1, wherein the processor is configured to:
determine that a vehicle has been parked;
set a timer for periodically waking the vehicle if the vehicle is powered-down;

periodically wake the vehicle in accordance with the timer; and responsive to waking the vehicle, compare a cellular signal to a predetermined usability threshold, wherein the processor is configured to:

report a usable cellular connection when the cellular signal is above the predetermined usability threshold and instruct the entity to use the wireless access point when the cellular signal is below the predetermined usability threshold.

* * * * *